Patented Nov. 26, 1929

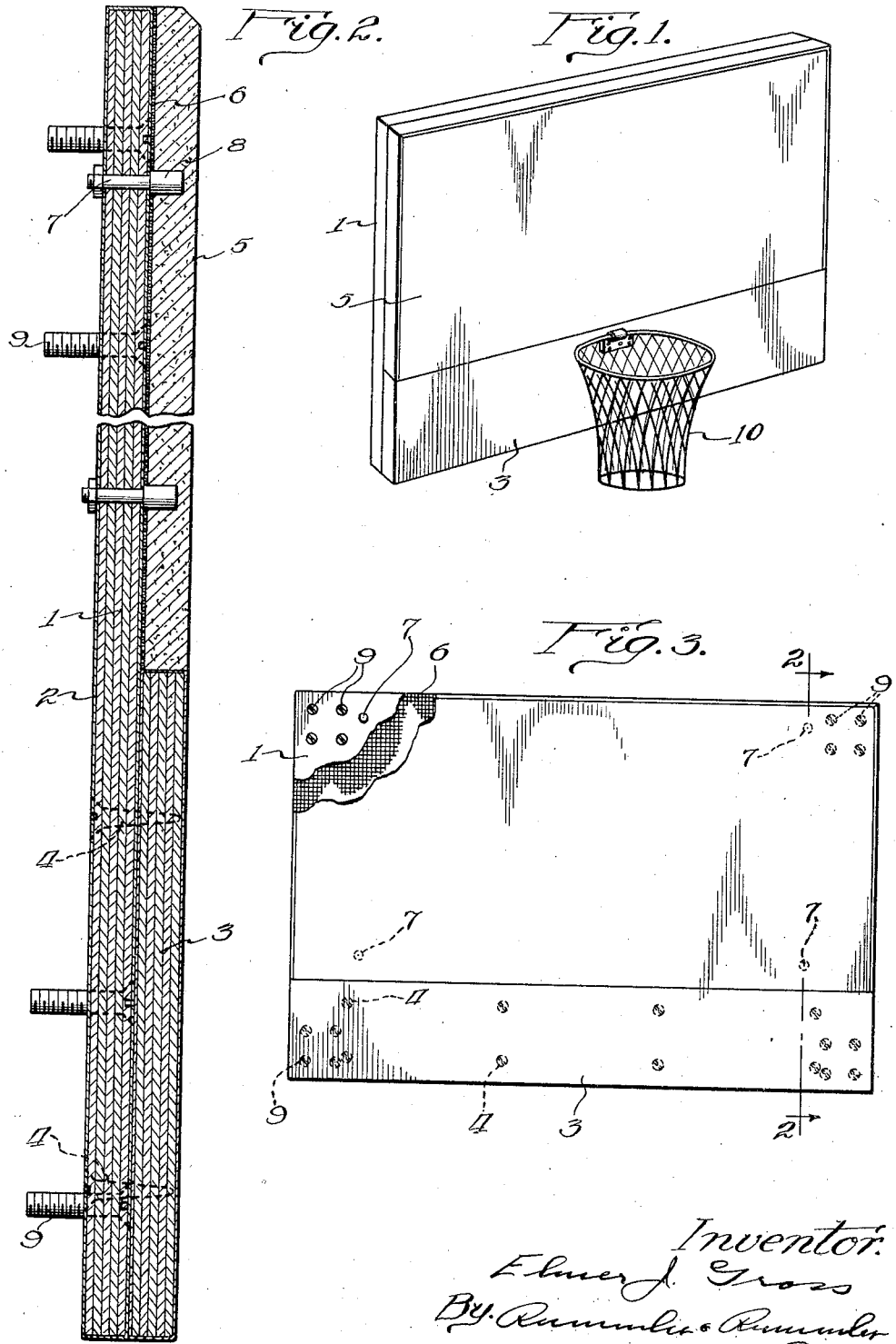

1,736,879

UNITED STATES PATENT OFFICE

ELMER J. GROSS, OF CHICAGO, ILLINOIS, ASSIGNOR TO CHICAGO GYMNASIUM EQUIPMENT COMPANY, OF CHICAGO, ILLINOIS, A CORPORATON OF ILLINOIS

BACKBOARD

Application filed June 29, 1928. Serial No. 289,293.

This invention relates to basket-ball backboards and utilizes in a new combination the laminated structure described in my co-pending application for patent, Serial Number 249,342, filed January 25, 1928.

The purpose of the present invention is to provide a backboard formed of a combination of wood and glass or other vitreous material in which is assured a safe and flush mounting of the vitreous portion of the board, retaining it in place even though accidentally cracked; and to provide a combination board of this class in which the wood portion thereof cannot warp, and which is of sufficient weight and rigidity to resist vibration when in use.

The objects of the invention are accomplished by a construction as shown in the drawings in which:

Figure 1 is a perspective view of the improved board with a basket supported thereon.

Fig. 2 is a vertical sectional view of the board.

Fig. 3 is a face view of the board with a portion of its vitreous face partly broken away.

Backboards of glass and other vitreous material have been used to some extent and, due to nonwarping qualities and ease of keeping clean, are well liked. The chief objections to glass boards are their fragility and likelihood of falling when broken, and that the channel iron supporting frames thereof project beyond the surface of the glass. Also glass boards cannot be successfully mounted on and backed by an ordinary wood board because the latter is likely to warp and pull away from the glass.

The improved construction shown in the drawings consists of a backboard provided with a facing over the greater part of its area of vitreous material, in order to insure a hard smooth surface and one which may easily be kept clean. This surface material is backed by a light laminated wood structure which is entirely sheathed in metal. The vitreous facing of the board also rests upon a similar laminated wood facing at the lower part of the board and to which the basket is secured. The laminated wood portions of the board are weatherproofed by the metal sheathing and therefore are not subject to warping or cracking. The vitreous facing adds some weight to the board, tending to lessen vibration thereof, particularly when the board is suspended, rather than being flat against the wall or supported from the floor. At the same time, the board is not so objectionably heavy or fragile as all-glass backboards.

Referring to the drawings, the laminated wood backing 1 is composed of layers of wood firmly glued together and to their metal sheathing 2. The latter serves to prevent access of moisture to the laminated part of the board. This laminated structure is an article of commerce which can be relied on to maintain its original form irrespective of climatic conditions. Secured thereto at the lower front portion of the board is a smaller laminated and sheathed board 3 for receiving a basket 10. The boards 1 and 3 are secured together by the screws 4 and it is also desirable to cement their contacting surfaces together. The vitreous facing 5 of the board is preferably both cemented and anchored to the backing 1. A layer of canvas 6 is interposed between the backing 1 and facing 5 and is firmly cemented to both the backing and facing. If the facing 5 becomes cracked, the canvas 6, to which it is cemented, serves to retain the portions thereof in place until the entire backboard may be removed. The anchoring means 7, which pass through the backing 1, project part way into the facing of vitreous material, holes being drilled from the back thereof to receive the heads 8 of the anchors 7. The screws 9, which extend rearwardly from the corners of the backing 1, are for receiving the flanges of the supporting brackets or suspending means for the backboard.

The above described construction provides a backboard of medium weight which is easily kept clean, gives a flush surface, that is, there are no iron frame members or other projections required along the edge of the vitreous portion of the board as is customary with an all-glass board. The improved construction also substantially avoids danger of the board dropping or a part thereof dropping off if cracked, while retaining many of the desirable qualities of an all-glass, marble or other vitreous backboard.

Although but one specific embodiment of this invention has been herein shown and described, it will be understood that numerous details of the construction shown may be altered or omitted without departing from the spirit of this invention as defined by the following claims.

I claim:

1. A basket-ball backboard comprising a laminated wood board sheathed in metal, a facing attached to said board comprising a lower portion consisting of laminated wood sheathed in metal and an upper portion of vitreous material abutting against and flush with said lower portion.

2. A basket-ball backboard comprising a laminated wood board sheathed in metal, a facing attached to said board comprising a lower portion consisting of laminated wood sheathed in metal and an upper portion of vitreous material resting upon said lower portion, and a fabric between and glued to said board and upper vitreous portion of the facing.

3. A basket-ball backboard comprising a laminated wood board sheathed in metal and a facing of vitreous material on said sheathered board and a fabric between and glued to said sheathered board and vitreous facing.

4. In a basket ball backboard, a back structure comprising wood-board sheathed in metal, a base section mounted on the face of said back structure at the bottom portion thereof for supporting a basket-ball basket, and an upper section comprising vitreous material supported on the upper edge of said base section and affixed to the front surface of said back structure.

5. In a basket ball backboard, a back structure comprising wood-board sheathed in metal, a base section mounted on the face of said back structure at the bottom portion thereof for supporting a basket-ball basket, a layer of fabric glued to the front surface of said back structure above said base section, and an upper section comprising vitreous material supported by the upper edge of said base section and glued to the outer side of said fabric layer, said fabric layer being provided for preventing falling of fragments of said vitreous material in the event the latter is broken.

6. As a manufactured article of basket-ball game furniture, a non-shatterable hard faced composite unitary backboard of resilient character comprising a thin metal-sheathed flat laminated wood backing and a single thin vitreous panel of integral character adherently secured thereto with a layer of fabric interposed, said backing being extended downward somewhat and provided with a complementary facing part, flush with said vitreous panel, whereon a receiving basket may be attached.

Signed at Chicago this 25th day of June, 1928.

ELMER J. GROSS